Jan. 23, 1962   R. D. WILSON ETAL   3,017,648
SPREADER FOR WAX OR THE LIKE
Filed Aug. 24, 1959   2 Sheets-Sheet 1
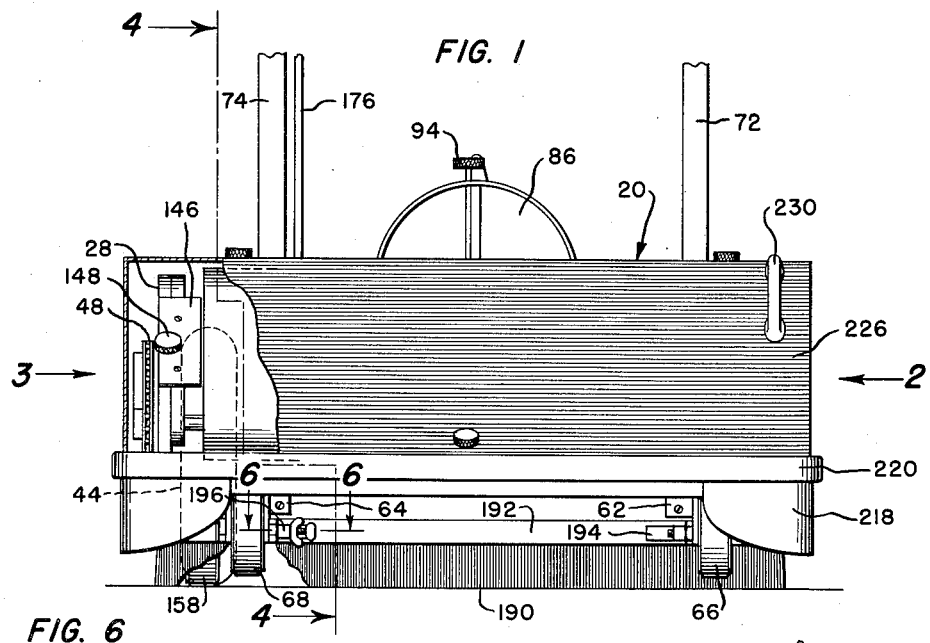
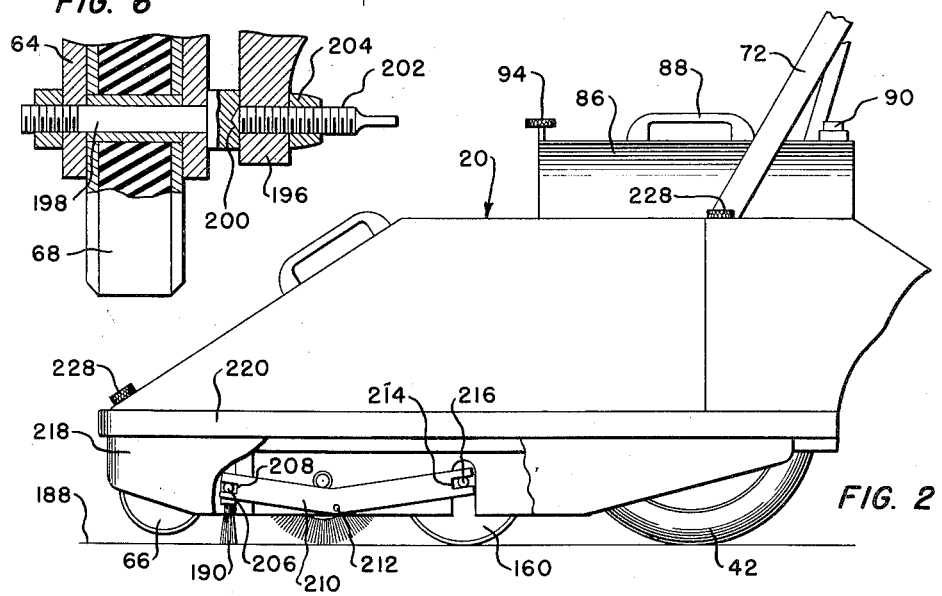
INVENTORS
ROSS D. WILSON
GEORGE A. DEARDORFF
BY
ATTORNEYS Jan. 23, 1962    R. D. WILSON ETAL    3,017,648
SPREADER FOR WAX OR THE LIKE
Filed Aug. 24, 1959    2 Sheets-Sheet 2
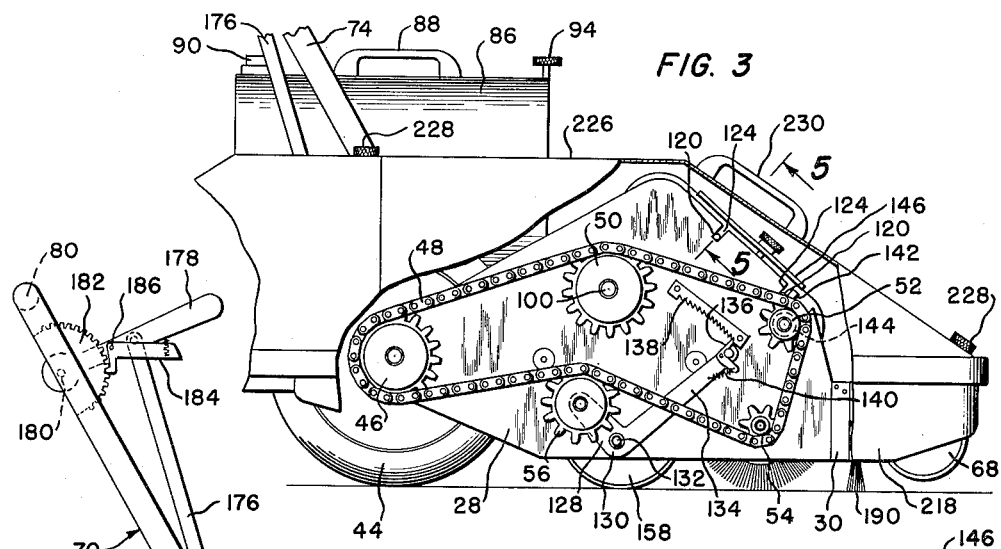
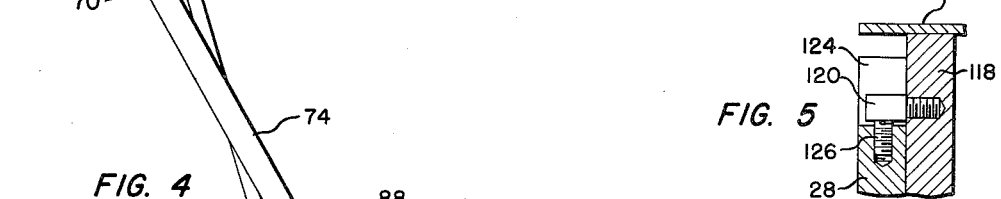
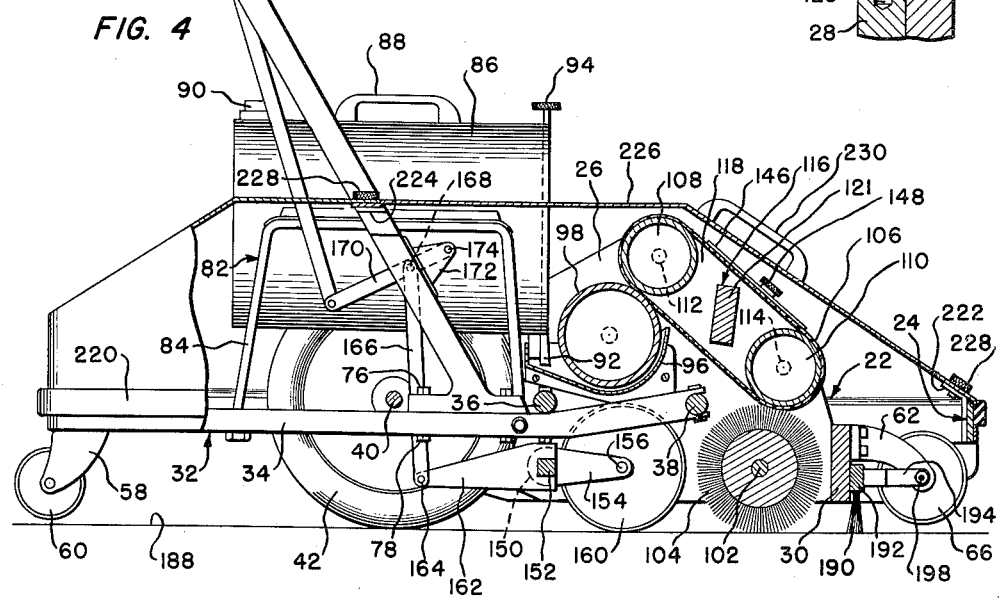
INVENTORS
ROSS D. WILSON
GEORGE A. DEARDORFF
ATTORNEYS

United States Patent Office 3,017,648
Patented Jan. 23, 1962

3,017,648
SPREADER FOR WAX OR THE LIKE
Ross D. Wilson, 4139 Swift St., San Diego 4, Calif., and George A. Deardorff, 217 Milden Road, Martinez, Calif.
Filed Aug. 24, 1959, Ser. No. 835,505
9 Claims. (Cl. 15—50)

The present invention relates to a spreader for a material in fluid form such as wax, and particularly to a machine for spreading wax on floors.

In carrying out the present invention, we provide a vehicle, preferably one using wheels or rollers. A tank for wax is carried by the vehicle and the fluid wax is drained, under valve control, into a trough. Rotatable means, in the form of a drum or cylinder is partly immersed in the wax in the trough; this rotatable means lifts wax from the trough and delivers the same to a conveyor. The conveyed wax is then delivered to a rotating brush and spread by the brush upon the floor.

More specifically, the conveyor for conveying wax from the rotatable lifting means comprises a rotatable element which wipes wax from the lifting means and is in wiping relationship with the rotating brush for delivering wax to the periphery of the brush.

Preferably the aforementioned rotatable conveying element moves in a direction contrary to the direction of movement of the rotatable lifting means and/or the brush at the places where it engages the lifting means and brush.

Too, we provide for adjusting the relative position of the lifting means and brush with respect to that rotatable conveyor so as to govern the amount of wax lifted from the trough and delivered to the brush.

In the preferred embodiment of the invention, the axes of the rotatable lifting means, the rotatable conveyor, and the rotatable brush are parallel and are disposed transversely and preferably at right angles to the direction of movement of the vehicle.

The vehicle includes two wheel means arranged rearwardly and forwardly of one another; the frame of the vehicle can be moved relative to the axle of one of the wheel means whereby the frame can be tilted about said one wheel; in this manner, the height of the brush, which is carried by the frame, may be adjusted so as to provide the desired relationship of the brush with respect to the floor. Too, in the embodiment illustrated, the rotatable wax lifting means, the conveyor and the brush are driven by the other of the wheel means and this said other wheel means is rotated by frictional engagement with the floor over which the vehicle is being moved. Obviously then, when the vehicle is stationary, the wax lifting means, the conveyor and the brush are inactive, or, when the said other wheel means is lifted off of the floor, those aforementioned rotatable elements are rendered inactive. Therefore, the frame can be so tilted, with respect to said one wheel means, that the other wheel is lifted off of the surface whereby the wax lifting means, the conveyor and the brush are rendered inactive; in this manner the machine can be moved over the floor without depositing wax when such movement is desired.

Further objects and advantages will be apparent from the following description, reference being had to the accompanying drawings wherein a preferred embodiment of the invention is illustrated.

In the drawings:

FIG. 1 is a front view of the spreader, part of the handle being broken away and part of the enclosing casing being broken away to more clearly show the mechanism underneath the casing;

FIG. 2 is a view looking in the direction of arrow 2 of FIG. 1, part of the frame covering being broken away to show the brush elevating mechanism;

FIG. 3 is a fragmentary view looking in the direction of arrow 3 of FIG. 1, part of casing being broken away to show part of the operating mechanism;

FIG. 4 is a side view of the spreader, part thereof being shown in section, the section being taken along line 4—4 of FIG. 1;

FIG. 5 is a sectional view taken along line 5—5 of FIG. 3 but on a somewhat larger scale; and FIG. 6 is a sectional view taken along line 6—6 of FIG. 1 but on a somewhat larger scale.

Referring more in detail to the drawings, the spreader is shown at 20. The machine includes a main frame 22 formed of a strip of steel 24. This frame is rectangular in shape, including front, rear and opposite sides. The main frame 22 also includes oppositely disposed side plates 26 and 28 and a connecting strip or bar 30. These side plates 26 and 28 and the bar 30 are secured to the steel strip 24 in any suitable manner which may be by welding or bolts. The main frame 22 also includes a U-shaped bar 32 attached to the strip 24, the yoke of which extends across the front of the frame and the legs thereof, one of which is shown at 34. These legs 34 are connected with one another by transversely disposed bars 36 and 38.

The frame 22 carries an axle 40, and two wheels 42 and 44 are suitably attached to the axle. A sprocket 46 is attached to the axle and of course rotates when the wheels are rotated. The sprocket 46 drives a chain 48 which in turn drives sprockets 50, 52, 54 and 56. Thus when the machine is moved forwardly, that is, to the left as viewed in FIGS. 3 and 4, all of the sprockets will be moved in a counterclockwise direction.

The main frame also carries a bracket 58 at the front thereof which in turn carries a roller 60. The rear of the frame carries brackets 62 and 64 which in turn carry, respectively, rollers 66 and 68. As will appear more clearly hereinafter, the frame at times is carried by the wheels 42, 44 and roller 60. The rollers 66 and 68 are used only for the purpose of supporting the machine in conjunction with the wheels 42 and 44 when, for example, the machine is being moved over stairs.

The machine is also includes a U-shaped handle 70 which extends upwardly and forwardly; the lower end of the legs 72 and 74 are suitably connected to the U-shaped bar 34 as by bolts 76 and nuts 78. The yoke 80 of the handle 70 is used for pulling and pushing the machine.

The frame also carries a cradle 82 including a plurality of U-shaped bars, one of which is shown at 84, and which are attached to the U-shaped bar 34. This cradle carries a tank 86 provided with a handle 88 for lifting the same. This tank 86 is provided with a circular opening closed by a plug 90. The tank is provided with an outlet 92 and this outlet is controlled by a valve, the knurled knob for manipulating the same being shown at 94.

The side plates 26 and 28 carry a trough 96, and this trough is provided with a curved bottom. The outlet 92 for the tank 86 is disposed within the trough for the purpose of delivering the fluid to the trough, namely for the purpose of delivering wax from the tank to the trough. A drum 98 has the lower portion thereof immersed in the trough and is driven by the sprocket 50 through the axle 100. This axle 100 is rotatably carried by the side plates 26 and 28. These side plates also carry an axle 102 adjacent the rear and lower portion thereof, and this axle is driven by the sprocket 54 and carries a brush 104. It is necessary to move the wax from the drum 98 to the periphery of the brush 104. Any suitable type of conveyor may be used for this purpose and in the instant embodiment the conveyor is in the form of a belt 106 which may be formed of leather or other suitable material. This belt is strung across two rollers 108 and 110. The axles for rollers 108 and 110 are shown at 112 and 114. These axles 112 and 114 are carried by a frame 116 including similarly shaped side plates, one of which is shown at 118, which are suitably connected with one another by a rectangularly shaped bar 121. This connection may be by bolts or welding. This frame 116 is removably carried by the side plates 26 and 28. Each of the side plates 118 is provided with two pins which are movable within sockets 124. The bottoms of these sockets are provided with adjustable stops 126 which determine the extent to which the frame can be moved downwardly. In this manner the relative position of the belt with respect to the drum 98 may be controlled. The axle 114 is attached to the sprocket 52, and therefore when the sprocket 52 is rotated, the roller 110 will be rotated, causing the rotation of the belt 106 and the roller 108. The belt 106 is in contact with the periphery of the elevator or drum 98 and is also in contact with the periphery of the brush 104. Consequently the wax delivered to the trough 96 will be elevated by the elevator 98, picked up by the belt 106 and delivered to the brush 104.

Sprocket 56 is rotatably carried by the short arm 128 of a bell crank lever 130. The bell crank lever 130 is suitably journalled on an axle 132 carried by plate 28. The outer end of the long arm 134 of the bell crank lever 130 carries a pivoted dog 136 which is arranged to be held in position by a stationary ratchet 138. This dog is normally held in the ratchet 138 by a spring 140 but can be released manually. The sprocket 56 is of the idler type and is used for tightening and loosening the chain 48. By releasing the dog 136, and permitting the bell crank lever to move in a counterclockwise direction, as viewed in FIG. 3, the chain 48 is so loosened so that it can be removed from the sprocket 52, and when so removed, the frame 116 can be removed from the machine. This is desirable so that access may be had for cleaning the drum 98, and, when the frame 116 is removed, carrying with it the rollers 108 and 110 and belt 106, whereby the belt may be cleaned. The side plate 28 is provided with a slot permitting removal of the bearing 144 for the axle 114.

The frame 116 is held in position with the pins 120 upon the stops 126 by a plate 146. This plate rests upon the rear edges of side plates 26 and 28, and is held in position by thumb screws 148 threaded into the edges of the plates 26 and 28. Thus it will be seen that when the screws 148 are removed, the plate 146 can be removed, and the frame 116 can be lifted away from the machine, whereby the belt 106 can be readily cleaned, and access may be had to the drum 98 for cleaning the same.

The side plates 26 and 28 provide journals for bearings, one of which is shown at 150. These bearings support a square shaft 152 which extends between the plates. The shaft 152 carries lever arms 154 which lever arms are carried by axes 156 which in turn are carried by wheels 158 and 160. These wheels extend rearwardly of the shaft 152. A lever 162 is attached to the shaft 152 and extends forwardly. The forward end of lever 162 is connected by a pin 164 to a link 166. Link 166 is pivotally attached by a pin 168 to a lever 170, and this lever 170 is pivotally connected to the handle bar 74 through a bracket 172 and pin 174. The other end of lever 170 is connected by a link 176 to a handle 178. This handle is pivotally mounted upon the handle bar 72 by a pin 180. The handle bar 72 carries an arcuate shaped ratchet 182 whose axis is the same as that of pin 180. A dog 184 is pivoted at 186 on the handle 178 and is arranged to be engaged between the teeth of the ratchet 182 for holding the handle and consequently the link 176, lever 170, link 176, lever arm 162, shaft 152, lever arm 154 and wheels 158 and 160 in desired relationship with respect to the frame and consequently the brush 104 of the vehicle.

It will be seen that when the handle 178 is lowered, the rear end of the frame is lowered, pivoting about the wheels 42 and 44. Thus should the brush 104 wear somewhat peripherally, the frame can be lowered by slightly lowering the handle 178.

By raising upwardly on the handle 178 the lever arm 162 will be raised and the play is such that the rear of the frame will be lifted sufficiently so that the wheels 42 and 44 are raised off of the surface 188 and the entire machine will be carried by the wheels 158 and 160 and the roller 60. When this occurs, there will be no driving relationship between the wheels 42 and the floor, and consequently the wax lifting drum 98, the conveyor belt 106 and the brush 104 will be rendered inactive. In this manner the machine may be moved across the floor without dispensing wax upon the floor, which of course is desirable when there is a need for moving the machine from one place to another without waxing the surface over which it moves.

It has been found that it is desirable to immediately wipe the floor with a brush after the wax has been deposited on to the floor by the brush 104. For this purpose a trailing wiper in the form of a brush 190 is provided. The base 192 of the brush 190 is carried by two brackets 194 and 196. These brackets extend forwardly and are pivotally mounted on the axle of rollers 66 and 68. As will be seen from FIG. 6, the bracket 64 for the rollers 66 and 68 carry axles 198, and these axles are provided with axially aligned sockets 200 which receive the tapered ends of screws 202. By screwing the screws 202 inwardly, the bracket 196 is held in pivotal relationship with the sockets 200. One of these screws is provided with a wing nut 204 for the ready manipulation of same.

It is desirable to lift brush 190 when the brush 104 is lifted off of the surface, and therefore the base 192 of the brush 190 is provided with pin 206 which is received in a socket 208 of lever 210. This lever is pivoted at 212, the rearward end of the lever being provided with socket 208. The forward end of this lever 210 is provided with socket 214 which receives a pin 216 carried centrally of the wheel 160. When the forward end of the machine is lifted for the purpose of raising the wheels 42 and 44 and resting the machine on the roller 60 and wheels 158 and 160, the lever 212 will pivot about the pin 212 causing the brush 190 to be lifted from the surface 188.

A suitable apron 218 depends from the main frame 22 to partly enclose the lower part of the machine, and a rubber bumper 220 surrounds the frame which is used for preventing the marring of furniture and walls.

The strip 24 carries a bracket 222; brackets 224 are also suitably carried by the handle leg 74. A removable cover 226 is carried by these brackets 222 and 224 and is held in place by knurled screws 228. This cover 226 is provided with a handle or handles 230 for manipulating the same.

From the foregoing it will be seen that as the machine moves forwardly, that is, to the left as viewed in FIGS. 3 and 4, the wheels 42 and 44, the sprocket 46, the chain 48 and the sprockets 50, 52 and 54 will be moved in a counterclockwise direction causing the drum 98, the rollers 108 and 110, the belt 106 and the brush 104 to move in a counterclockwise direction. It will be observed that inasmuch as the drum 98 is in engagement with the lower run of the belt 106, the drum 98 and belt 106 are moving contrary to one another at the point of engagement with one another. This causes a ready deposit of wax upon the belt. Also inasmuch as the lower run of the belt 106 is in engagement with the periphery of the brush 104, it is moving contrary to the direction of movement of the periphery of the brush at the place where the periphery of the brush engages the belt 106 whereby the wax is readily deposited upon the periphery of the brush. In this manner ample wax is delivered to the brush 104.

Inasmuch as the troughs 96 spans the drum 98 and the drum 98 spans the belt 106, a uniform quantity of wax is delivered to the belt throughout the width thereof, and this uniform layer of wax is uniformly delivered to the periphery of the brush 104. This is made possible by the fact that the axes of the drum 98, the rollers 108 and 110, and the brush 104 lie parallelly with respect to the axis of the wheels 42 and 44.

The quantity of fluid wax delivered to the trough 96 is controlled by the manually operated valve 94, and the amount of wax delivered to the belt 106, and consequently to the periphery of the brush 104, can be regulated by regulating the quantity of liquid delivered to the trough 96 and the relative position of the belt 106 with respect to the drum 98. As previously stated, this relative position can be regulated by adjusting the position of the stops 126.

To render the machine operative as a spreader, it is necessary only to operate the handle 178 so that the wheels 42 and 44 are lowered on to the surface 188. Then by moving the machine to the left as viewed in FIGS. 3 and 4, the wheels will drive the mechanism for lifting the wax from the trough 96 and conveying the same by the conveyor 106 to the periphery of the brush 104. To render the machine inactive as a spreader, the wheels 42 and 44 are lifted from the surface 188 by lowering the front end of the machine whereby it may be moved on the roller 60 and the wheels 168 and 160.

While the form of embodiment herein shown and described constitutes a preferred form, it is to be understood that other forms may be adopted falling within the scope of the claims that follow.

We claim:

1. A spreader for spreading wax or the like in fluid form on a floor, comprising in combination, a vehicle; a tank for fluid carried by the vehicle; a trough for receiving fluid from the tank; means for conveying the fluid from the tank to the trough; a rotatable drum immersed in the trough for lifting fluid therefrom; a rotatable brush for spreading the fluid onto the floor surface over which the vehicle is being moved; and means above the trough and in contact with the rotatable drum for conveying fluid from the rotatable drum to the brush.

2. A spreader as defined in claim 1, in which the last mentioned means includes a rotatable element engaged by the rotatable drum and engaging the rotatable brush.

3. A spreader as defined in claim 1, in which the last mentioned means includes a rotatable element engaged by the rotatable drum and engaging the rotatable brush; and means for causing the rotatable element to move in a direction contra to that of the rotatable drum.

4. A spreader as defined in claim 1, in which the last mentioned means includes a rotatable element engaged by the rotatable drum and engaging the rotatable brush; and means for causing the rotatable element to move in a direction contra to that of the brush.

5. A spreader as defined in claim 1, in which the last mentioned means includes a rotatable element engaged by the rotatable drum and engaging the rotatable brush; and means for causing the rotatable element to move in a direction contra to that of the rotatable drum and the brush.

6. A spreader for spreading wax or the like in fluid form on a floor, comprising in combination, a vehicle; a tank for fluid carried by the vehicle; a trough for receiving fluid from the tank; means for conveying the fluid from the tank to the trough; rotatable fluid lifting means for lifting fluid from the trough; a rotatable brush for spreading the fluid onto the floor surface over which the vehicle is being moved; means above the trough and in contact with the rotatable fluid lifting means for conveying fluid from the rotatable fluid lifting means to the brush; and means for adjusting the relative position of the last mentioned conveying means with respect to the rotatable fluid lifting means.

7. A spreader as defined in claim 6, and including means for adjusting the relative position of the last mentioned conveying means with respect to the rotatable brush.

8. A spreader as defined in claim 6, and including means for adjusting the relative position of the last mentioned conveying means with respect to the rotatable fluid lifting means and the brush.

9. A spreader as defined in claim 1, and including means for adjusting the relative position of the conveying means with respect to the rotatable lifting means.

References Cited in the file of this patent

UNITED STATES PATENTS

| | | |
|---|---|---|
| 809,580 | Reichenbach | Jan. 9, 1906 |
| 1,426,986 | Hasselberger | Aug. 22, 1922 |
| 1,764,546 | Burnley | June 17, 1930 |
| 1,827,905 | Picker | Oct. 20, 1931 |
| 2,349,245 | Campbell | May 23, 1944 |